United States Patent
Venham et al.

[11] Patent Number: 5,939,547
[45] Date of Patent: Aug. 17, 1999

[54] FORMATION OF BLOCKED ISOCYANURATE GROUP-CONTAINING POLYISOCYANATES FROM PARTIALLY BLOCKED ISOCYANATES

[75] Inventors: Lanny D. Venham, Oakdale; James W. Rosthauser; Michael K. Jeffries, both of Pittsburgh, all of Pa.

[73] Assignee: Bayer Corporation, Pittsburgh, Pa.

[21] Appl. No.: 08/996,067

[22] Filed: Dec. 22, 1997

[51] Int. Cl.[6] .................. C07D 251/34; C08G 18/79; C08G 18/80
[52] U.S. Cl. ............... 544/222; 528/45; 528/73; 528/80; 544/193
[58] Field of Search .................. 528/45, 73, 80; 544/193, 222

[56] References Cited

U.S. PATENT DOCUMENTS

| | | | |
|---|---|---|---|
| 4,491,663 | 1/1985 | Kordomenos et al. | 544/193 |
| 4,748,242 | 5/1988 | Halpaap et al. | 544/222 |
| 4,851,531 | 7/1989 | Halpaap et al. | 544/222 |
| 5,246,557 | 9/1993 | Hughes et al. | 204/181.4 |

*Primary Examiner*—Rabon Sergent
*Attorney, Agent, or Firm*—Joseph C. Gil; Thomas W. Roy

[57] ABSTRACT

The present invention relates to a process for the preparation of blocked polyisocyanates containing isocyanurate groups by a) reacting 20 to 80 equiv. % of the isocyanate groups of an organic diisocyanate with a pyrazole or triazole blocking agent, b) trimerizing the remaining unblocked isocyanate groups in the presence of a basic trimerization catalyst until the isocyanate content is less than 2.5% by weight, based on the weight of the blocked polyisocyanate and c) optionally blocking any remaining isocyanate groups with a blocking agent for isocyanate groups.

The present invention also relates to the use of these blocked polyisocyanates for the production of polyisocyanate addition products.

18 Claims, No Drawings

DETAILED DESCRIPTION OF THE INVENTION# FORMATION OF BLOCKED ISOCYANURATE GROUP-CONTAINING POLYISOCYANATES FROM PARTIALLY BLOCKED ISOCYANATES

BACKGROUND OF THE INVENTION

1. Field of the Invention

The present invention relates to a process for the preparation of blocked polyisocyanates containing isocyanurate groups by conducting the blocking reaction prior to the trimerization reaction.

2. Description of the Prior Art

It is known to block isocyanurate group-containing polyisocyanates for subsequent use in powder coatings or solvent-containing stoving lacquers. When blended with a suitable isocyanate-reactive component and heated to an elevated temperature sufficient to release the blocking agents, the polyisocyanates react with the isocyanate-reactive component, generally a polyol, to form a coating.

One of the disadvantages of conducting the trimerization reaction before the blocking reaction is that it is difficult to obtain the same end point for the trimerization reaction. To even approximate the same end point it is necessary to constantly monitor the isocyanate content and, when the desired content is reached, to terminate the reaction by heating and/or by the addition of a catalyst poison.

A more advantageous method for preparing the blocked polyisocyanates would be to conduct the blocking reaction before the trimerization reaction. The amount of the blocking agent can be precisely added and after the blocking reaction the remaining isocyanate groups can be trimerized. Since the amount of isocyanate groups remaining after the blocking reaction can be accurately determined, identical blocked polyisocyanates can be produced from batch to batch. This is advantageous because it ensures consistent product quality.

However, when attempts were made to prepare blocked polyisocyanates by conducting the blocking reaction prior to the trimerization reaction using common blocking agents, such as methyl ethyl ketoxime and ε-caprolactam, either the trimerization reaction did not proceed or was only partially complete when using standard trimerization catalysts, or significant amounts of by-products were obtained when additional catalyst was added to reduce the isocyanate content.

Accordingly, it is an object of the present invention to prepare blocked polyisocyanates in which the blocking reaction is conducted before the trimerization reaction and in which the trimerization can be conducted to completion or substantially to completion without the formation of significant quantities of by-products.

This object may be achieved in accordance with the present invention by using certain blocking agents for the blocking reaction and by conducting the trimerization reaction using certain trimerization catalysts to be described hereinafter.

SUMMARY OF THE INVENTION

The present invention relates to a process for the preparation of blocked polyisocyanates containing isocyanurate groups by a) reacting 20 to 80 equiv. % of the isocyanate groups of an organic diisocyanate with a pyrazole or triazole blocking agent, b) trimerizing the remaining unblocked isocyanate groups in the presence of a basic trimerization catalyst until the isocyanate content is less than 2.5% by weight, based on the weight of the blocked polyisocyanate and c) optionally blocking any remaining isocyanate groups with a blocking agent for isocyanate groups.

The present invention also relates to the use of these blocked polyisocyanates for the production of polyisocyanate addition products.

DETAILED DESCRIPTION OF THE INVENTION

In the first step of the process according to the present invention 20 to 80 equiv. %, preferably 40 to 60 equiv. % of the isocyanate groups of an organic diisocyanate are reacted with a pyrazole or triazole blocking agent for isocyanate groups. Suitable blocking agents for use in accordance with the present invention are the pyrazole blocking agents, which are known and described, e.g., in U.S. Pat. No. 5,246,557, herein incorporated by reference, preferably the alkyl substituted pyrazole blocking agents, especially dimethyl pyrazole.

Also suitable are the triazole blocking agents, such as 1,2,4-triazole. These blocking agents may also contain alkyl substituents, such as 3,5-dimethyl-1,2,4-triazole. The most preferred blocking agents for use in accordance with the present invention are 3,5-dimethyl pyrazole and 1,2,4-triazole, especially 3,5-dimethyl pyrazole.

Suitable organic diisocyanate, which may be used to prepare the blocked polyisocyanates containing isocyanurate groups, include aliphatic, cycloaliphatic, araliphatic and aromatic diisocyanates having a molecular weight of up to 400. Preferred diisocyanates are those containing aliphatically or cycloaliphatically bound isocyanate groups. Especially preferred are diisocyanates that contain a cyclic group.

Examples of suitable diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, xylylene diisocyanate, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4-diisocyanatotoluene (and mixtures thereof with preferably up to 35 wt. %, based on the mixture, of 2,6-diisocyanato-toluene), 4,4'-diphenylmethane diisocyanate (and mixtures thereof with 2,4'-diphenyl-methane diisocyanate and/or 2,2'-diphenylmethane diisocyanate), 1,5-diisocyanato naphthalene and mixtures thereof.

Preferred diisocyanates include 1,6-hexamethylene diisocyanate, isophorone diisocyanate (IPDI) and bis-(4-isocyanatocyclohexyl)-methane (HMDI), especially HMDI.

The blocking reaction is carried out at a temperature of 50 to 120° C., preferably 60 to 100° C., either in the absence of solvent or in suitable solvents, such as n-butyl acetate, methoxypropyl acetate or toluene, or in mixtures of higher aromatic solvents, such as those sold by Exxon under the trade name Solvesso.

After completion of the blocking reaction, the blocked intermediates are trimerized in the presence of a basic trimerization catalyst, preferably a trimerization catalysts having a $pK_b$ of less than $-2$, more preferably less than $-3$ and most preferably less than $-4$.

Examples of suitable catalysts are the basic trimerization catalysts known for the trimerization of organic diisocyanates. Preferred for the process according to the invention are the quaternary ammonium hydroxides corresponding to the formula

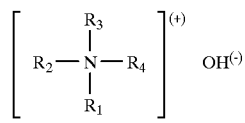

which are described in U.S. Pat. No. 4,324,879 and German Offenlegungsschriften 2,806,731 and 2,901,479. Preferred quaternary ammonium hydroxides are those wherein the radicals $R_1$ to $R_4$ represent identical or different alkyl or aralkyl groups having from 1 to 20, preferably from 1 to 4 carbon atoms, which may optionally be substituted by hydroxyl groups. Two of the radicals $R_1$ to $R_4$ may form a heterocyclic ring having from 3 to 5 carbon atoms together with the nitrogen atom and optionally with a further nitrogen or oxygen atom. Also the radicals $R_1$ to $R_3$ in each case may represent ethylene radicals which form a bicyclic triethylene diamine structure together with the quaternary nitrogen atom and a further tertiary nitrogen atom, provided that the radical $R_4$ then represents a hydroxyalkyl group having from 2 to 4 carbon atoms in which the hydroxyl group is preferably arranged in a 2-position to the quaternary nitrogen atom.

Especially preferred catalysts for the process according to the invention are the alkoxides, preferably $C_1$ to $C_4$ alkoxides, more preferably methoxides, which correspond to the preceding hydroxides, i.e., in which the hydroxide group is replaced with an alkoxide group.

The trimerization of the starting diisocyanate mixture may be carried out in the absence or in the presence of solvents which are inert to isocyanate groups. Depending upon the area of application of the products according to the invention, low to medium-boiling solvents or high-boiling solvents can be used. Suitable solvents include aromatic compounds such as toluene or xylene; halogenated hydrocarbons such as methylene chloride and trichloroethylene; ethers such as diisopropyl-ether; and alkanes such as cyclohexane, petroleum ether or ligroin.

The trimerization catalysts are generally used in quantities of about 0.0005 to 5% by weight, preferably about 0.002 to 2% by weight, based on the diisocyanate used. The catalysts may be used in pure form or in solution. The previously named solvents which are inert to isocyanate groups are suitable as solvents, depending upon the type of catalysts. Dimethyl formamide or dimethyl sulphoxide may also be used as solvents for the catalysts.

The reaction temperature for isocyanurate formation in accordance with the present invention is about 10 to 160° C., preferably about 50 to 150° C. and more preferably about 60 to 90° C. In the presence of the required catalyst or catalyst solution the trimerization begins and is indicated by an exothermic reaction. The progress of the reaction is followed by determining the NCO content by a suitable method such as titration, refractive index or IR analysis. The trimerization reaction is terminated when the isocyanate group content of the blocked polyisocyanate mixture is less than 2.5%, preferably less than 1.0%, and more preferably less than 0.5% by weight.

When the isocyanate content has been reduced to the desired amount, the trimerization reaction can optionally be terminated, for example, by the addition of a catalyst poison, such as those set forth in the previously discussed literature references. For example, when using basic catalysts the reaction may be terminated by the addition of a quantity, which is at least equivalent to the catalyst quantity, of an acid chloride such as benzoyl chloride or diethylhexyl phosphate. Heat-labile catalysts, such as the previously described quaternary ammonium hydroxides, may be deactivated by either poisoning or heating the catalyst.

When thermally deactivating such catalysts, the catalyst quantity and the reaction temperature are preferably selected such that the catalyst which continuously decomposes is totally decomposed when the desired degree of trimerization is reached. The quantity of catalyst or reaction temperature which is necessary to achieve this decomposition can be determined by a preliminary experiment. It is also possible initially to use a lesser quantity of a heat sensitive catalyst than is necessary to achieve the desired degree of trimerization and to subsequently catalyze the reaction by a further incremental addition of catalyst, whereby the quantity of catalyst added later is calculated such that when the desired degree of trimerization is achieved, the total quantity of catalyst has decomposed.

Suspended catalysts may also be used. These catalysts may be removed after achieving the desired degree of trimerization by filtering the reaction mixture.

Any residual isocyanate groups remaining after termination of the trimerization reaction may optionally be reacted with additional blocking agent until isocyanate groups can no longer be detected in the reaction mixture. For this step it is possible, although not preferred, to use blocking agents other than the previously described pyrazole or triazole blocking agents since the trimerization reaction is complete and cannot be affected by these other blocking agents. However, it is preferred to react the residual isocyanate groups with pyrazole or triazole blocking agents.

The blocked polyisocyanates according to the invention are essentially identical to products obtained by first preparing polyisocyanates containing isocyanurate groups and then blocking the remaining isocyanate groups. This is not the case with products prepared by blocking polyisocyanates with blocking agents other than those required by the present invention and then conducting the trimerization reaction. When attempts are made to reduce the isocyanate content of these products to less than 2.5% by weight, the resulting products contain other isocyanate adducts as impurities in much higher amounts than the products according to the invention. This may be seen from the following examples and comparison examples.

The blocked polyisocyanates containing isocyanurate groups according to the invention may be combined with other compounds containing isocyanate-reactive groups and used for the production of polyisocyanate addition products, in particular one-component polyurethane coating compositions. Preferred co-reactants for use in the one-component coating compositions include polyhydroxyl polyesters and polyhydroxyl polyacrylates. The polyester polyols contain at least 2 preferably 2 to 15 and more preferably 2 to 6 hydroxyl groups, and have a molecular weight of 400 to 6,000, preferably 800 to 3,000. The molecular weights are number average molecular weights ($M_n$) and are determined by end group analysis (OH number). In accordance with the present invention the polyhydroxyl polycarbonates are included with the polyester polyols.

The amounts of the blocked polyisocyanate and isocyanate-reactive compounds, preferably polyhydroxyl compounds, are selected to provide an equivalent ratio of blocked isocyanate groups to isocyanate-reactive groups of about 0.8 to 3, preferably about 0.9 to 2.0 and more preferably about 1.0 to 1.5.

To accelerate hardening, the coating compositions may contain known polyurethane catalysts, e.g., tertiary amines such as triethylamine, pyridine, methyl pyridine, benzyl dimethylamine, N,N-dimethylamino cyclohexane, N-methyl-piperidine, pentamethyl diethylene triamine, 1,4-diaza-bicyclo[2,2,2]-octane and N,N'-dimethyl piperazine; or metal salts such as iron(III)-chloride, zinc chloride, zinc-2-ethyl caproate, tin(II)-ethyl caproate, dibutyltin(IV)-dilaurate and molybdenum glycolate.

The coating compositions may also contain other additives such as pigments, dyes, fillers, levelling agents and solvents. The coating compositions may be applied to the substrate to be coated in solution or from the melt by conventional methods such as painting, rolling, pouring or spraying.

The coating compositions containing the polyisocyanates prepared according to the invention provide coatings possessing the well known properties of polyurethane coatings, i.e. they are light-fast, color-stable in the presence of heat and very resistant to abrasion. In addition, they are characterized by high hardness, elasticity, very good resistance to chemicals, high gloss, excellent weather resistance, excellent environmental etch resistance and good pigmenting qualities.

The invention is further illustrated, but is not intended to be limited by the following examples in which all parts and percentages are by weight unless otherwise specified.

EXAMPLES

Example 1

(Comparison) HMDI ½ blocked with methyl ethyl ketoxime

A round bottom flask was equipped with a thermometer, nitrogen bubbler, condenser, and an overhead stirrer. The flask was charged with HMDI (575.0 g, 4.38 equivalents) and xylene (328.3 g). To the stirred solution, methyl ethyl ketoxime (191.0 g, 2.19 equivalents) was added slowly. The temperature was not allowed to exceed 80° C. After the addition was complete, the mixture was stirred at 50° C. for 1 hour. At this point, the theoretical isocyanate content was 8.41%. A nitrogen inlet tube was placed into the solution, and a slow stream of nitrogen was bubbled through the solution for at least 30 minutes, while the mixture was heated to 70° C. A catalyst solution (2.97 g) was then added to the mixture. The catalyst solution was prepared by mixing 10 g of a 40% benzyltrimethyl-ammonium hydroxide solution in methanol with 10 g of 1-butanol. The temperature was maintained between 70 and 80° C. When the refractive index of the solution did not change significantly, more catalyst solution (1.24 g) was added. After 3.5 hours from the beginning of the catalyst additions, the isocyanate content was still 6.28% as determined by titration. Even after adding 3.76 g of the 40% benzyltrimethyl-ammonium hydroxide solution in methanol, the isocyanate content was still 5.10% as determined by titration.

Example 2

HMDI ½ blocked with dimethyl pyrazole (DMP)

A round bottom flask was equipped with a thermometer, nitrogen bubbler, condenser, and an overhead stirrer. The flask was charged with HMDI (575.0 g, 4.38 equivalents), xylene (328.3 g), and 3,5-dimethyl-pyrazole (210.4 g, 2.19 equivalents). The temperature was raised to 70° C. The mixture was stirred at 70° C. for 1 hour. At this point, the theoretical isocyanate content was 8.26%. A nitrogen inlet tube was placed into the solution, and a slow stream of nitrogen was bubbled through the solution for at least 30 minutes, while the mixture was held at 70° C. A catalyst solution (3.10 g) was then added to the mixture. The catalyst solution was prepared by mixing 10 g of a 40% benzyltrimethyl-ammonium hydroxide solution in methanol with 10 g of 1-butanol. The temperature was maintained between 70° and 80° C. When the change in the refractive index of the solution slowed after about 10 minutes, more catalyst solution (1.25 g) was added. After 2 hours from the beginning of the catalyst additions, the isocyanate content was 2.93% as determined by titration. After sitting overnight, the isocyanate content was 2.22% as determined by titration. 3,5-dimethyl pyrazole (57.9 g, 0.603 equivalents) was added to react with the remaining isocyanate groups.

Gel permeation chromatography of this product and the product of Example 4 demonstrated that the products were essentially identical.

Example 3

HMDI ½ blocked with DMP

A round bottom flask was equipped with a thermometer, nitrogen bubbler, condenser, and an overhead stirrer. The flask was charged with HMDI (287.5 g, 2.19 equivalents), xylene (164.2 g), and 3,5-dimethyl pyrazole (105.2 g, 1.10 equivalents). The temperature was raised to 70° C. The mixture was stirred at 70° C. for 1 hour. At this point, the theoretical isocyanate content was 8.22%. A nitrogen inlet tube was placed into the solution and a slow stream of nitrogen was bubbled through the solution for at least 30 minutes, while the mixture was held at 70° C. A catalyst solution (1.07 g) was then added to the mixture. The catalyst solution was prepared by mixing 10 g of a 40% benzyltrimethyl-ammonium methoxide solution in methanol with 30 g of 1-butanol. The temperature was maintained between 70° and 80° C. The change in the refractive index of the solution slowed after about 10 minutes, therefore more catalyst solution (2.23 g) was added. Further additions of catalyst were added (1.19 g, 1.17 g, 1.15 g). After 2 hours from the beginning of the catalyst additions, the isocyanate content was 1.07% as determined by titration. After sitting overnight, an additional amount of catalyst (1.07 g) was added, after heating the mixture to 70° C. After three hours, the isocyanate content was 0.55% as determined by titration. At this point 1.42 g of di-2-ethylhexylphosphate was added to neutralize any remaining catalyst.

Example 4

(Comparison) HMDI blocked with DMP after trimerization

A round bottom flask was equipped with a thermometer, nitrogen bubbler, condenser, and an overhead stirrer. The flask was then charged with HMDI (287.5 g, 2.19 equivalents) and xylene (123.2 g). A nitrogen inlet tube was then placed into the solution, and a slow stream of nitrogen was bubbled through the solution for at least 30 minutes, while the mixture was raised to 70° C. A catalyst solution (2.3 g) was then added to the mixture. The catalyst solution was prepared by mixing 10 g of a 40% benzyltrimethylammonium hydroxide solution in methanol with 10 g of 1-butanol. The temperature was maintained between 70° and 80° C. When the isocyanate content was approximately 13.0% as determined by titration, 0.9 g of di-2-ethylhexylphosphate was added to neutralize any remaining catalyst.

To 324.8 g of the above product (actual isocyanate content=12.51%), was added 3,5-dimethylpyrazole (97.65 9, 1.016 equivalents), and xylene (77.6 g). This resulting mixture was heated under a nitrogen atmosphere for about one hour at 70° C. At this time, no free isocyanate groups could be detected by infrared analysis.

Example 5

HMDI ½ blocked with DMP

A round bottom flask was equipped with a thermometer, nitrogen bubbler, condenser, and an overhead stirrer. The flask was charged with HMDI (227.4 g, 1.73 equivalents), xylene (175.0 g), and 3,5-dimethyl pyrazole (93.0 g, 0.967 equivalents). The temperature was raised to 70° C. The mixture was stirred at 70° C. for 1 hour. At this point, the theoretical isocyanate content was 6.47%. A nitrogen inlet tube was then placed into the solution, and a slow stream of nitrogen was bubbled through the solution for at least 30 minutes, while the mixture was held at 70° C. A catalyst solution (2.29 g) was added to the mixture. The catalyst solution was prepared by mixing 10 g of a 40% benzyltrimethyl ammonium methoxide solution in methanol with 30 g of 1-butanol. The temperature was maintained between 70° and 80° C. When the change in the refractive index of the solution slowed after about 10 minutes, more catalyst solution (1.74 g) was added. Further additions of catalyst were added (1.69 g, 1.20 g, 1.15 g). After 5 hours from the beginning of the catalyst additions, the isocyanate content was 0.607% as determined by titration. A final amount of catalyst (1.14 g) was added. After about six hours total reaction time, the isocyanate content was 0.46% as determined by titration. At this point, 1.43 g of di-2-ethylhexylphosphate was added to neutralize any remaining catalyst.

Gel permeation chromatography of this product and the product of Example 4 demonstrated that the products were essentially identical.

Example 6

(Comparison) HMDI ½ blocked with ε-caprolactam

A round bottom flask was equipped with a thermometer, nitrogen bubbler, condenser, and an overhead stirrer. The flask was charged with HMDI (113.7 g, 0.867 equivalents), xylene (90.7 g), and ε-caprolactam (54.7 g, 0.484 equivalents). The temperature was raised to 120° C. while stirring for 5 hours. At this point, the theoretical isocyanate content was 6.21%. The mixture was cooled to 70° C., a nitrogen inlet tube was placed into the solution, and a slow stream of nitrogen was bubbled through the solution for at least 30 minutes. A catalyst solution (4.36 g) was then added to the mixture. The catalyst solution was prepared by mixing 10 g of a 40% benzyltrimethylammonium hydroxide solution in methanol with 10 g of 1-butanol. The temperature was maintained between 70° and 80° C. Not much reaction appeared to occur, therefore 2.57 g of the 40% benzyltrimethylammonium hydroxide solution in methanol was added. After sitting overnight, the isocyanate content was 1.90% as determined by titration.

Gel permeation chromatography of the product showed the formation of by-products not found in the product of Example 4 (prepared by the conventional method of trimerizing first and then blocking) or the product prepared in Example 5 according to the invention.

Example 7

(Comparison) HMDI ½ blocked with methyl ethyl ketoxime

A round bottom flask was equipped with a thermometer, nitrogen bubbler, condenser, and an overhead stirrer. The flask was charged with HMDI (113.7 g, 0.867 equivalents) and xylene (83.9 g). To this stirred solution, methyl ethyl ketoxime (42.2 g, 0.484 equivalents) was added slowly. The temperature was not allowed to exceed 80° C. After the addition was complete, the mixture was stirred at 50° C. for 1 hour. At this point, the theoretical isocyanate content was 6.71%. A nitrogen inlet tube was then placed into the solution, and a slow stream of nitrogen was bubbled through the solution for at least 30 minutes, while the mixture was heated to 70° C. A catalyst solution (2.34 g) was then added to the mixture. The catalyst solution was prepared by mixing 10 g of a 40% benzyltrimethylammonium methoxide solution in methanol with 30 g of 1-butanol. The temperature was maintained between 70° and 80° C. When the refractive index remained relatively unchanged, more catalyst solution (1.08 g) was added. After two more catalyst additions (2.31 g and 1.16 g) the isocyanate content was reduced to 2.01% as determined by titration.

Gel permeation chromatography showed that the product was not identical to a methyl ethyl ketoxime blocked trimer prepared by the conventional method (trimerizing first, then blocking) or by the method according to the present invention.

It is apparent from the GPC analysis that other types of isocyanate adducts, e.g, allophanate groups, biuret groups, etc., were formed in Examples 6 and 7 in addition to the desired isocyanurate groups. While the exact products have not been identified, allophanate or biuret groups could be formed from the urethane or urea hydrogens that result from the reaction between the blocking agents and isocyanate groups. It is known that hydrogens such as these can react with additional isocyanate groups to form allophanate or biuret groups, respectively.

The additional amounts of catalyst that were added also result in the addition of further amounts of the monoalcohol solvents for the catalysts. These monoalcohols can also react with isocyanate groups to form urethane groups, which can subsequently react with additional isocyanate groups to form allophanate groups.

The reaction of isocyanate groups to form these other isocyanate adducts as opposed to the formation of isocyanurate groups is responsible for the reduction of the NCO content in Comparison Examples 6 and 7.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of blocked polyisocyanates containing isocyanurate groups by
    a) reacting 20 to 80 equiv. % of the isocyanate groups of an organic diisocyanate containing aliphatically and/or cycloaliphatically bound isocyanate groups with a pyrazole or triazole blocking agent,
    b) trimerizing the remaining unblocked isocyanate groups in the presence of a basic trimerization catalyst until the isocyanate content is less than 2.5% by weight, based on the weight of the blocked polyisocyanate and
    c) optionally blocking any remaining isocyanate groups with a blocking agent for isocyanate groups.

2. The process of claim 1 wherein said organic diisocyanate comprises an organic diisocyanate comprising a member selected from the group consisting of 1,4-tetramethylene diisocyanate, 1,6-hexamethylene diisocyanate, bis-(4-isocyanatocyclohexyl)-methane, 1,3- and 1,4-bis-(isocyanatomethyl)-cyclohexane, xylylene diisocyanate and α,α,α',α'-tetramethyl-1,3- and/or -1,4-xylylene diisocyanate.

3. The process of claim 1 wherein said organic diisocyanate comprises bis-(4-isocyanatocyclohexyl)-methane.

4. The process of claim 1 wherein said blocking agent comprises 3,5-dimethyl pyrazole.

5. The process of claim 2 wherein said blocking agent comprises 3,5-dimethyl pyrazole.

6. The process of claim 3 wherein said blocking agent comprises 3,5-dimethyl pyrazole.

7. A process for the preparation of blocked polyisocyanates containing isocyanurate groups by
   a) reacting 20 to 80 equiv. % of the isocyanate groups of an organic diisocyanate containing aliphatically and/or cycloaliphatically bound isocyanate groups with a pyrazole or triazole blocking agent,
   b) trimerizing the remaining unblocked isocyanate groups in the presence of a trimerization catalyst having a $pK_b$ of less than -2 until the isocyanate content is less than 2.5% by weight, based on the weight of the blocked polyisocyanate and
   c) optionally blocking any remaining isocyanate groups with a blocking agent for isocyanate groups.

8. The process of claim 7 wherein said organic diisocyanate comprises an organic diisocyanate comprising a member selected from the group consisting of 1,4-tetramethylene diisocyanate, 1,6-hexamethylene diisocyanate, bis-(4-isocyanatocyclohexyl)-methane, 1,3- and 1,4-bis-(isocyanatomethyl)-cyclohexane, xylylene diisocyanate and $\alpha,\alpha,\alpha',\alpha'$-tetramethyl-1,3- and/or -1,4-xylylene diisocyanate.

9. The process of claim 7 wherein said organic diisocyanate comprises bis-(4-isocyanatocyclohexyl)-methane.

10. The process of claim 7 wherein said blocking agent comprises 3,5-dimethyl pyrazole.

11. The process of claim 8 wherein said blocking agent comprises 3,5-dimethyl pyrazole.

12. The process of claim 9 wherein said blocking agent comprises 3,5-dimethyl pyrazole.

13. A process for the preparation of blocked polyisocyanates containing isocyanurate groups by
   a) reacting 40 to 60 equiv. % of the isocyanate groups of an organic diisocyanate containing aliphatically and/or cycloaliphatically bound isocyanate groups with a pyrazole or triazole blocking agent,
   b) trimerizing the remaining unblocked isocyanate groups in the presence of a trimerization catalyst having a $PK_b$ of less than -4 until the isocyanate content is less than 2.5% by weight, based on the weight of the blocked polyisocyanate and
   c) optionally blocking any remaining isocyanate groups with a blocking agent for isocyanate groups.

14. The process of claim 13 wherein said organic diisocyanate comprises an organic diisocyanate comprising a member selected from the group consisting of 1,4-tetramethylene diisocyanate, 1,6-hexamethylene diisocyanate, bis-(4-isocyanatocyclohexyl)-methane, 1,3- and 1,4-bis-(isocyanatomethyl)-cyclohexane, xylylene diisocyanate and $\alpha,\alpha,\alpha',\alpha'$-tetramethyl-1,3- and/or -1,4-xylylene diisocyanate.

15. The process of claim 13 wherein said organic diisocyanate comprises bis-(4-isocyanatocyclohexyl)-methane.

16. The process of claim 13 wherein said blocking agent comprises 3,5-dimethyl pyrazole.

17. The process of claim 14 wherein said blocking agent comprises 3,5-dimethyl pyrazole.

18. The process of claim 15 wherein said blocking agent comprises 3,5-dimethyl pyrazole.

* * * * *